United States Patent
Stevenson

(10) Patent No.: US 9,645,601 B2
(45) Date of Patent: May 9, 2017

(54) POINT OF CONTROL REMOTE-ACTUATION APPARATUS AND METHODS

(71) Applicant: Robert L. Stevenson, Tucson, AZ (US)

(72) Inventor: Robert L. Stevenson, Tucson, AZ (US)

( * ) Notice: Subject to any disclaimer, the term of this patent is extended or adjusted under 35 U.S.C. 154(b) by 0 days.

(21) Appl. No.: 14/697,246

(22) Filed: Apr. 27, 2015

(65) Prior Publication Data

US 2016/0313757 A1    Oct. 27, 2016

(51) Int. Cl.
*G05G 1/00* (2006.01)
*G05G 7/10* (2006.01)

(52) U.S. Cl.
CPC ..................... *G05G 7/10* (2013.01)

(58) Field of Classification Search
CPC ... G05G 7/10; G05G 7/02; G05G 1/02; H02B 11/127; B25J 1/04; B25J 1/23; B25J 1/12; B25J 11/0025; B25J 11/002; B25J 17/0241; B25J 18/02; B25J 9/123; B25J 9/1689
See application file for complete search history.

(56) References Cited

U.S. PATENT DOCUMENTS

| | | | |
|---|---|---|---|
| 3,173,555 A * | 3/1965 | Kaye | B25J 9/04 |
| | | | 414/730 |
| 3,935,950 A | 2/1976 | Burch | |
| 4,034,867 A | 7/1977 | Akagawa | |
| 4,463,227 A * | 7/1984 | Dizon | H02B 11/26 |
| | | | 200/50.07 |
| 4,536,690 A | 8/1985 | Belsterling et al. | |
| 4,790,718 A | 12/1988 | Vickers | |
| 4,849,778 A | 7/1989 | Samuelson | |
| 4,941,106 A * | 7/1990 | Krieger | B23Q 17/24 |
| | | | 318/568.16 |
| 4,995,782 A * | 2/1991 | Suyama | B25J 17/0241 |
| | | | 414/732 |
| 6,668,466 B1 | 12/2003 | Bieg et al. | |
| 2005/0156877 A1* | 7/2005 | Schaeffer | G05G 9/04737 |
| | | | 345/156 |
| 2010/0204646 A1* | 8/2010 | Plicchi | A61B 1/00149 |
| | | | 604/95.01 |
| 2011/0057674 A1* | 3/2011 | Weissacher | G01R 31/2891 |
| | | | 324/750.16 |
| 2012/0055765 A1* | 3/2012 | Zylstra | H02B 11/127 |
| | | | 200/50.24 |

OTHER PUBLICATIONS

International Search Report for PCT/US2016/029383 dated Jul. 26, 2016.

* cited by examiner

*Primary Examiner* — William Kelleher
*Assistant Examiner* — Jake Cook
(74) *Attorney, Agent, or Firm* — Quarles & Brady LLP; Gavin J. Milczarek-Desai

(57) ABSTRACT

Controlling a switch or valve at a distance is achieved by a support member having a movable portion, with the moveable portion including an elongate member, and a drive mechanism in communication with the moveable portion. A motor, hand crank, or other force transmission apparatus acts to move the drive mechanism and thus the movable portion and elongate member such that a valve or switch is actuated at a distance from a user.

18 Claims, 6 Drawing Sheets

POINT OF CONTROL REMOTE-ACTUATION APPARATUS AND METHODS

CROSS-REFERENCE TO RELATED APPLICATIONS

Not Applicable.

BACKGROUND OF THE INVENTION

Field of the Invention

This disclosure relates to apparatus and methods for remote operation of potentially hazardous equipment, such as electrical switches. More particularly, the disclosure provides apparatus and methods for the controlling equipment through remote actuation of a mechanical link, while distancing a human operator from a potential hazard.

Background

It is well understood that industrial equipment includes points of control such as valves and switches that manage very large and potentially dangerous amounts of energy or materials. The vast majority of such control points are operated safely. However, there are some situations, e.g., equipment malfunction, use of equipment outside of rated specifications, or equipment misuse, which can lead to hazardous situations such as explosions, toxic material release, and the like.

For example, in the power distribution industry, personnel who work on or near energized electrical equipment can be seriously injured or killed as a result of arcing faults. An arcing fault is the flow of current through the air between phase conductors and neutral or ground and can result in a tremendous release of energy in the form of extremely high temperatures and pressures along with shrapnel hurling through the air at high velocity. For this reason, when repair work or periodic maintenance needs to be accomplished, the circuit breakers are tripped (opened) and moved out of conductive contact with the primary and secondary disconnects and removed from the switchgear cell. Some circuit breaker switches are rotated with a "hot stick" (insulated rod) while others are operated by hooking the end of a hot stick into a ring connected to a movable contact and pulling or pushing on the ring to open or close the contacts respectively.

More generally, control mechanisms broadly fall into two categories: rotary operation and linear operation. Thus, it is desirable to provide improved apparatus and methods for actuating valves and/or switches at a distance from a user such that improved safety results.

SUMMARY OF THE INVENTION

The disclosure herein relates to apparatus and methods for actuating points of control, such as valves and switches, at a distance. Controlling a switch or valve at a distance is achieved by an elongate member coupled with a support member having a movable portion and a drive mechanism in communication with the moveable portion. A motor or other way of providing motive force (e.g., hand crank) acts to move the drive mechanism and thus the movable portion and elongate member such that a valve or switch is actuated at a distance from a user.

These and other features, aspects, and advantages will become better understood upon consideration of the following detailed description, drawings and appended claims.

DETAILED DESCRIPTION OF THE INVENTION

Figure 1:
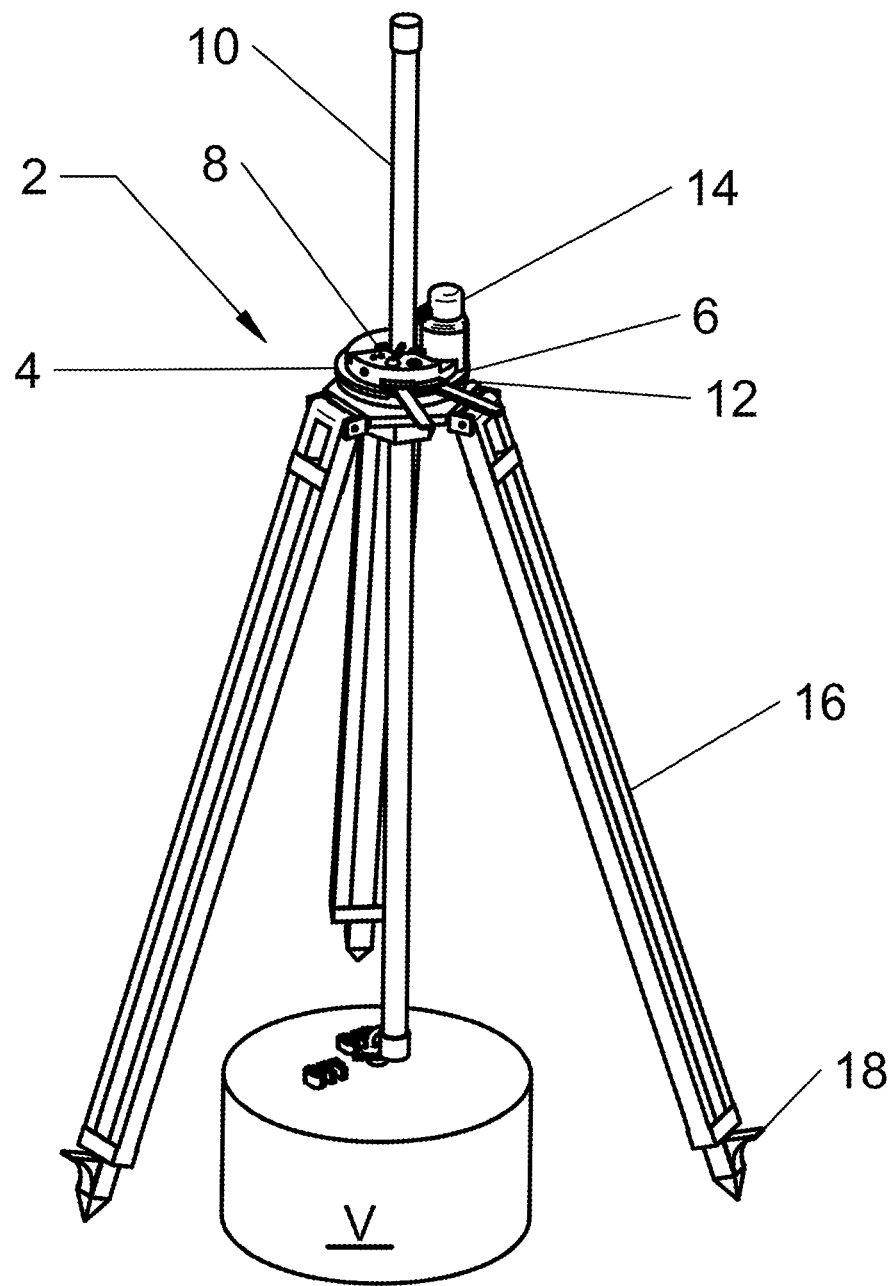
FIG. 1 is a perspective view of a first embodiment.

In a first embodiment shown in FIG. 1, a point of control, e.g., switch or valve, controlling apparatus 2 is depicted. The apparatus 2 includes a support member 4 having a movable portion 6, with the moveable portion being coupled with an elongate member 10 (as through a holder 8), with the elongate member being engaged along a length portion such that the elongate member and movable portion are not in axial alignment. The elongate member 10 is not limited to a particular shape or configuration and may be, for example, a rod, plank, or I-beam adapted to engage a point of control at a distance. A drive mechanism 12 in communication with the moveable portion 6 is adapted to move the moveable portion 6 and holder 8 in response to a motive force.

In this embodiment, the movable portion 6 of the support member 4 is planar and has the holder 8 (e.g., a clamp or splined area) centrally disposed therein. The apparatus 2 may further include a motor 14 adapted to engage the drive mechanism 12 or the motor may be connected to the drive mechanism by a user prior to use of apparatus 2. Also, the drive mechanism 12 preferably is offset from the movable portion 6 such that the drive mechanism and movable portion are not in axial alignment (e.g., they are side-by-side to each other as shown in FIG. 1). This has been found to provide better torque in some applications where rotary force is needed to move the elongate member such that a switch or valve are actuated.

In electrical switch contexts, the elongate member 10 is an electrically insulated rod (e.g. a "hot stick") and the holder 8 may be a clamp. Moreover, where the switch is a vault switch, the support member 4 further includes one or more engagement section(s) 16 adapted for positioning the support member on a surface, such as a section of floor or ground (see FIG. 4). While multiple engagement sections forming a tripod-like structure are shown in this embodiment, many other structures are possible, such as a pole or sheet of rigid material. Preferably, the engagement sections include securing members such as pointed ends 18.

The motor and drive mechanism of the apparatus are not intended to be limited to a particular type or a type of motion. Thus, for example, the motor and drive mechanism may cooperate to actuate the movable section either linearly (see FIG. 5) (e.g., extension and retraction) or rotatably. Moreover, manual structures for actuating the drive means also may be used, such as a hand crank (not shown).

Figure 2:
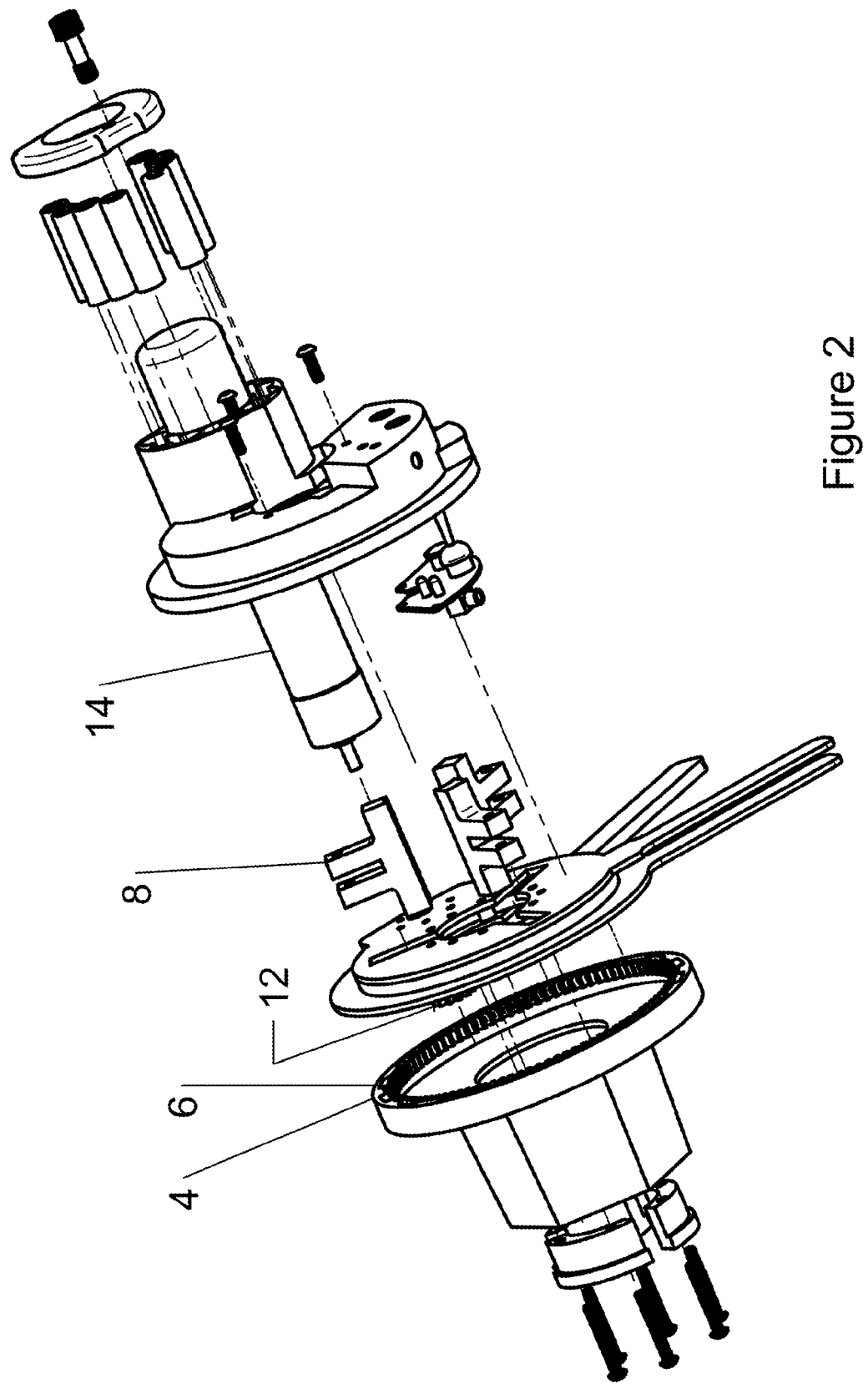
FIG. 2 is an enlarged, exploded representation of the embodiment in FIG. 1 without the engagement sections and elongated member
Figure 3:
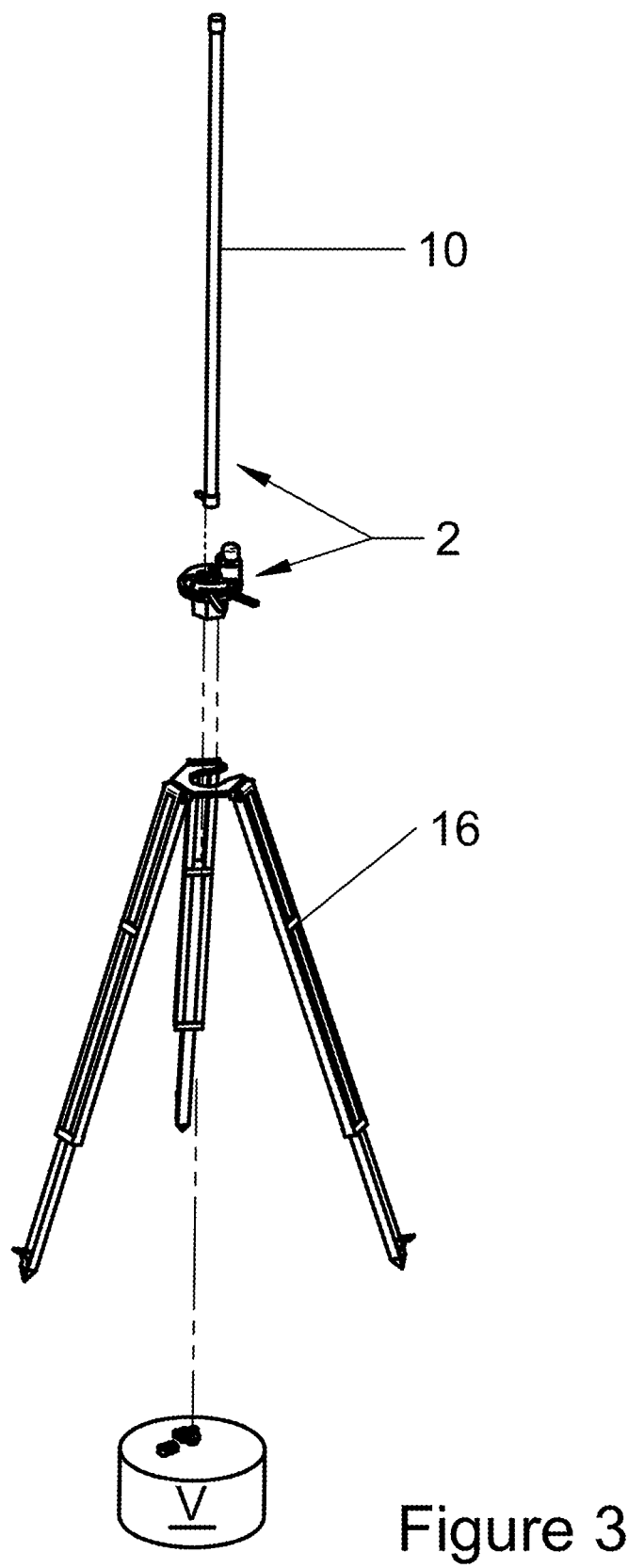
FIG. 3 is a partially exploded view of the first embodiment positioned for vertical actuation of a point of control.
Figure 4:
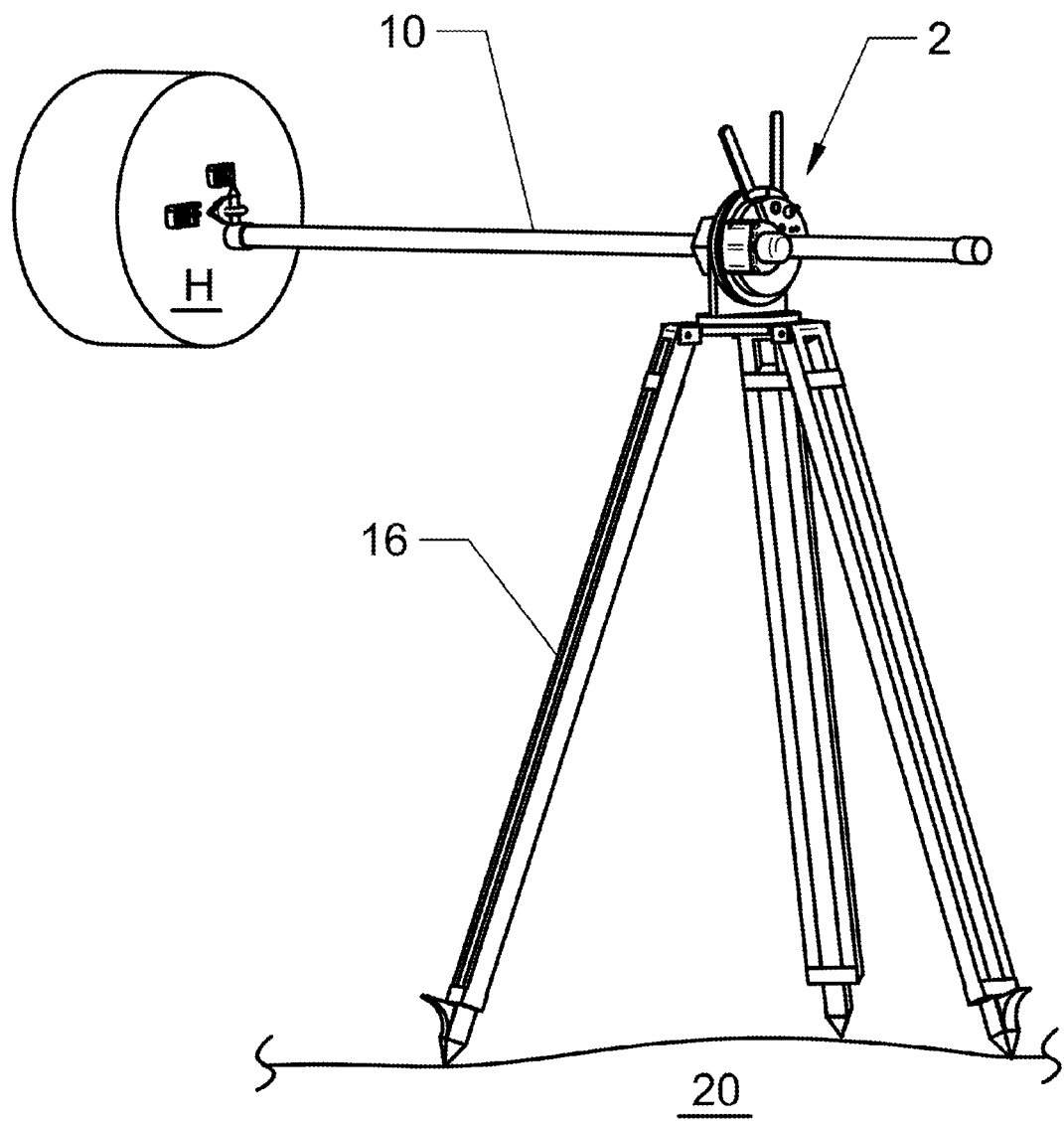
FIG. 4 is an elevated perspective view of the first embodiment positioned on a surface for horizontal actuation of a point of control.

Turning to FIG. 2, an exploded and enlarged view of the support member 4, movable portion 6 (e.g., a slewing ring), and select other components of the first embodiment is shown. FIG. 3 shows a partially exploded view of the first embodiment positioned for vertical actuation of a point of control, such as a vault switch V. Alternatively, FIG. 4 is an elevated perspective view of the first embodiment positioned on a surface 20 for horizontal actuation of a point of control. Thus, the support member may include one or more movable engagement members being adaptable to position the apparatus on a surface in at least two orientations.

Figure 5:
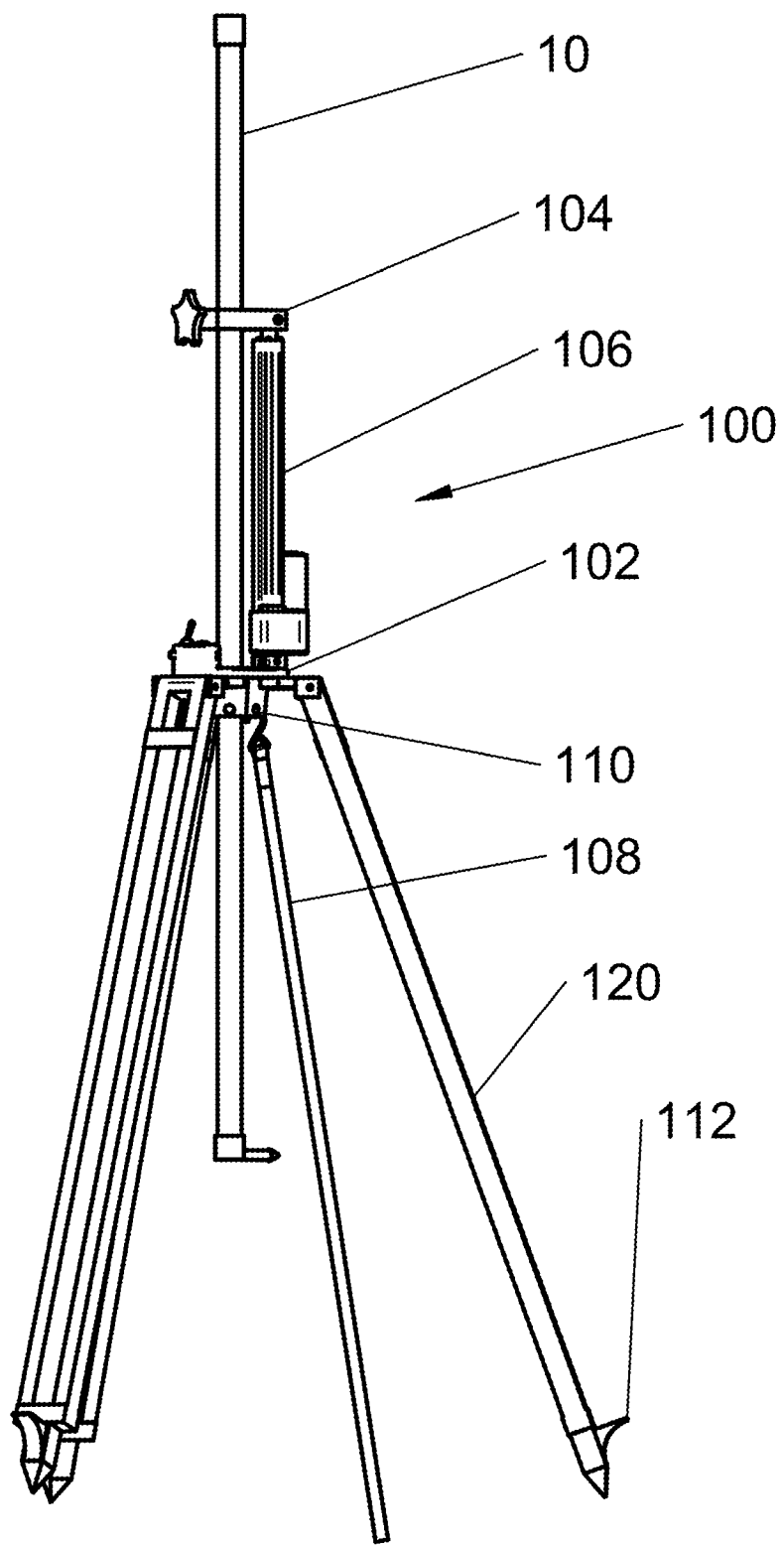
FIG. 5 is an elevated perspective view of a second embodiment that utilizes linear movement of an elongated member.

In a second embodiment shown in FIG. 5, the apparatus for remote-actuation is reconfigured to provide linear actuation. The apparatus 100 has a support member 102 which also serves as the mounting point for the system controls. Element 104 is a moveable clamp to secure the elongate member 10. Drive mechanism 106 (which includes a motor) is a linear actuator which provides the motive force to push or pull the elongate member as required. Strap or "tie-down" 108 allows a user to connect between provided mounting points 110 on the support member 102 and suitable points on the point of control or its support structure (not shown). This "tie-down" 108 provides the necessary reaction force to allow for the mechanism to operate the point of control. In circumstances where it is not possible or desirable to rely on "tie-down" 108, provisions have been made in the in the shape of the foot (securing member 112) of the engagement means 120 to allow the use of commonly available ballast weights such as sand bags (not shown).

Figure 6:
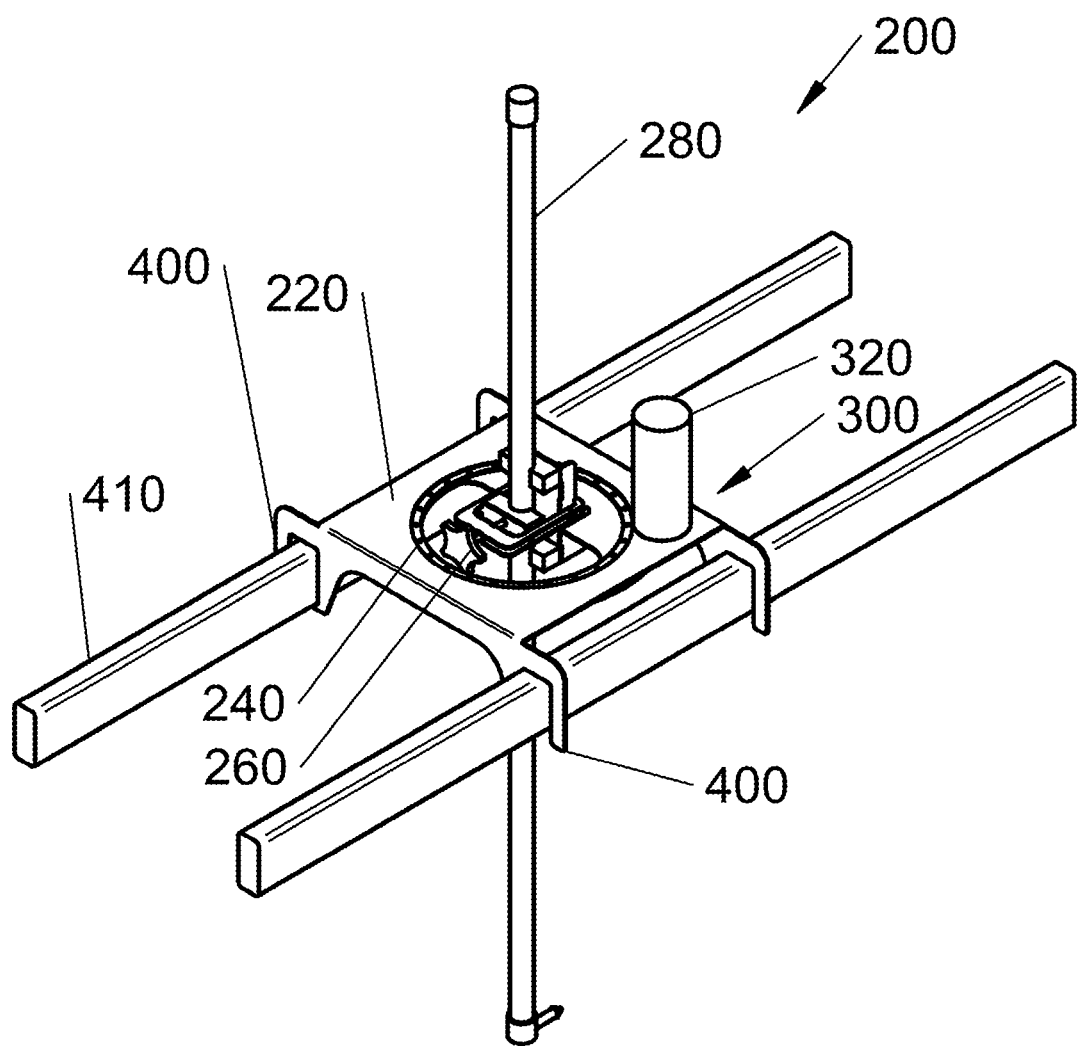
FIG. 6 is elevated perspective view of a third embodiment.

In a third embodiment as shown in FIG. 6, yet another remote-actuating apparatus is illustrated. The apparatus 200 has planer support member 220 including a rotatable portion 240, with the rotatable portion 240 further including a clamp 260 adapted to engage an elongate member 280. A drive mechanism 300 in communication with the rotatable portion 240 is adapted to rotate the rotatable portion 240 and clamp 260 in response to a motive force.

As with the first embodiment, the apparatus 200 may include a motor 320 adapted to engage the drive mechanism 300 (or the motor may be connected by a user). The actuation of the rotatable portion 240 and clamp 260 through the motor 320 may be remotely controllable by a wired or wireless controller known in the art. Furthermore, the drive mechanism 300 may be offset from the clamp such that the drive mechanism and clamp are not in axial alignment when rotation of the elongate member 280 is desired. Also, the support member 220 may further include engagement sections such as tabs 400 adapted for mounting the support member on a surface such as planks or bars 410.

In some embodiments, the drive mechanism and/or moveable portion are removably coupled to the support member, thereby allowing for simplicity of repair, etc. Moreover, some embodiments further include a load measurement indicator 500 that indicates torque versus rotational position as a proxy for operation status.

From the description and figures provided herewith, methods for operating a point of control at a distance with a remote-actuation apparatus are readily apparent. In one method embodiment, wherein the remote-actuation apparatus includes an elongate member coupled with a movable portion of a support member and the support member has a drive mechanism, the method includes actuating the drive mechanism such that said movable portion moves the elongate member and thereby operates the point of control at a distance.

Preferably, the elongate member is coupled to the moveable member along a length portion of the elongate member such that said elongate member and moveable portion are not in axial alignment, thereby providing greater torque in some applications.

In another method for operating a point of control at a distance, a user couples an elongate member with a movable portion of a support member, with the support member having a drive mechanism; and then the user actuates the drive mechanism such that the movable portion moves the elongate member and thereby operates said point of control.

As will be apparent from the description above, the embodiments may be used in methods for operating a switch or valve at a distance. Thus, a method may include the steps of coupling an elongate member, which is held by a support member with a drive mechanism and a motor, to a switch or valve and activating the motor such that said elongate member moves the switch or valve to a desired position.

The above description and examples are not intended to limit the invention, with is defined by the claims and equivalents thereto.

I claim:

1. A point of control remote-actuation apparatus, comprising:
    an elongate member having a first end and second end,
    a support member having a movable portion, said moveable portion being adjustably coupled with said elongate member along any portion of a length of said elongate member such that said first end and said second end of the elongate member are free of contact with said point of control remote-actuation apparatus during an actuation operation; and
    a drive mechanism in communication with said moveable portion, said drive mechanism configured to provide torque to the moveable portion and elongate member in response to a motive force, wherein said drive mechanism is offset from the movable portion such that the drive mechanism and movable portion are not in axial alignment.

2. The apparatus of claim 1, wherein said drive mechanism is removably coupled to said support member.

3. The apparatus of claim 1, wherein said movable portion is removably coupled to said support member.

4. The apparatus of claim 1, wherein said elongate member is an electrically insulated rod.

5. The apparatus of claim 1, further including a motor adapted to operate said drive mechanism.

6. The apparatus of claim 1, wherein said movable portion further includes a clamp that engages said elongate member.

7. The apparatus of claim 1, wherein said support member further includes at least two engagement sections that are positionable.

8. The apparatus of claim 1, wherein said movable portion comprises a slewing ring.

9. A point of control remote-actuation apparatus, comprising:
    a support member having a rotatable portion, said rotatable portion including a holder configured to engage an elongate member along any portion of a length of said elongate member and such that a first end and a second end of the elongate member are free of contact with said point of control remote-actuation apparatus; and
    a drive mechanism in communication with said rotatable portion, said drive mechanism adapted to rotate said rotatable portion and elongate member engaged by said holder in response to a motive force, wherein said drive mechanism is offset from the holder such that the drive mechanism and holder are not in axial alignment.

10. The apparatus of claim 9, wherein said drive mechanism is removably coupled to said support member.

11. The apparatus of claim 9, wherein said movable portion is removably coupled to said support member.

12. The apparatus of claim 9, wherein said elongate member is an electrically insulated rod.

13. The apparatus of claim 9, further including a motor adapted to operate said drive mechanism.

14. The apparatus of claim 9, wherein said movable portion further includes a clamp that engages said elongate member.

15. The apparatus of claim 9, wherein said support member further includes at least two engagement sections that are positionable.

16. The apparatus of claim 9, wherein said movable portion comprises a slewing ring.

17. A method for operating a point of control at a distance with a remote-actuation apparatus, said apparatus including an elongate member coupled with a movable portion of a support member along any portion of a length of said elongate member and such that a first end and a second end of the elongate member are free of contact with said remote-actuation apparatus, with said support member having a drive mechanism that is offset from the movable portion such that the drive mechanism and movable portion are not in axial alignment, comprising the step of:

actuating said drive mechanism such that said movable portion rotates said elongate member and thereby operates said point of control at a distance.

18. The method of claim 17, wherein said elongate member is an electrically insulated rod.

\* \* \* \* \*